(12) United States Patent
Cunliffe et al.

(10) Patent No.: US 6,467,046 B1
(45) Date of Patent: Oct. 15, 2002

(54) SYSTEM AND METHOD FOR AUTOMATICALLY DISTRIBUTING COPIES OF A REPLICATED DATABASE IN A COMPUTER SYSTEM

(75) Inventors: Joseph E. Cunliffe, Colorado Springs, CO (US); Dale R. Passmore, Colorado Springs, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 1042 days.

(21) Appl. No.: 08/643,550

(22) Filed: May 6, 1996

(51) Int. Cl.$^7$ ................................................. H02H 3/05
(52) U.S. Cl. ................................. 714/6; 714/47; 714/49
(58) Field of Search ....................... 395/182.04, 182.03, 395/182.02, 182.01, 182.08; 714/6–8, 15, 47, 48, 49

(56) References Cited

U.S. PATENT DOCUMENTS

| | | | |
|---|---|---|---|
| 4,321,666 A | * 3/1982 | Tasar et al. | 364/200 |
| 4,323,966 A | * 4/1982 | Whiteside et al. | 364/200 |
| 5,280,607 A | * 1/1994 | Bruck et al. | 395/575 |
| 5,423,037 A | * 6/1995 | Hvasshovd | 395/600 |
| 5,440,727 A | * 8/1995 | Bhide et al. | 395/444 |
| 5,452,441 A | * 9/1995 | Esposito et al. | 395/182.11 |
| 5,513,354 A | * 4/1996 | Dwork et al. | 395/650 |
| 5,542,055 A | * 7/1996 | Amini et al. | 395/281 |
| 5,555,404 A | * 9/1996 | Torbjornsen et al. | 395/600 |
| 5,568,375 A | * 10/1996 | Rausch | 364/131 |
| 5,613,106 A | * 3/1997 | Thurman et al. | 395/620 |
| 5,621,884 A | * 4/1997 | Behears et al. | 395/182.08 |
| 5,630,045 A | * 5/1997 | Krygowski et al. | 395/182.08 |
| 5,640,561 A | * 6/1997 | Satoh et al. | 395/618 |

FOREIGN PATENT DOCUMENTS

| EP | 0 593 062 A | 4/1994 |
|---|---|---|
| WO | WO 94 25919 A | 11/1994 |

OTHER PUBLICATIONS

Thomas, R.H. "A Majority Consensus Approach to Concurrency Control for Multiple Copy Databases," ACM Transactions on Database Sys, vol. 4, No. 2, pp. 180–209., Jun. 2, 1979.*

Davies, Daniel, "Synchronization and Matching in Redundant Sys.", IEEE Transactions on Computers, vol. C–27, No. 6, pp. 531–539, Jun. 6, 1978.*

Pittelli, F.M., "Reliable Scheduling in a TMR Database Sys.", ACM Transactions on Computer Sys, vol. 7, No. 1, pp. 25–38, Feb. 1989.*

(List continued on next page.)

*Primary Examiner*—Norman M. Wright
(74) *Attorney, Agent, or Firm*—William J. Kubida; Hogan & Hartson LLP (57) ABSTRACT

A computer implemented system, method and computer program product for automatically distributing copies of a replicated database for a computer system comprising at least first and second host computers. Each of the host computers operatively control at least one associated computer mass storage device controller coupled to commonly accessible computer mass storage devices by at least one storage device bus. The system and method comprises the step of enumerating each of the various host computers of the computer system, each of the computer mass storage device controllers associated with each host computer and each of the computer mass storage devices coupled to the storage device buses coupling the controllers. Copies of the replicated database are then automatically distributed across the computer mass storage devices such that failures of one or more of the computer mass storage device controllers or of one or more of the computer mass storage devices will not interrupt operation of the replicated database in the computer system.

8 Claims, 3 Drawing Sheets

OTHER PUBLICATIONS

Paris, J.F., "Voting with Witnesses : A Consistency Scheme for Replicated Files", IEEE 6$^{th}$ Conference Distributed Computing Sys. pp. 606–612, 1986.*

Proceedings of the Symposium on Reliable Distributed Systems, Oct. 5–7, 1992, No. SYMP. 11, Institute of Electrical and Electronics Engineers, pp. 57–65, Spasojevic M.: "Optimal Replica Control Protocols for Ring Networks".

Proceedings of the Symposium on Reliable Distributed Systems, Oct. 5–7, 1992, No. SYMP. 11, Institute of Electrical and Electronics Engineers, pp. 20–27, Paris J., et al.: "Dynamic Management of Highly Replicated Data".

* cited by examiner

SYSTEM AND METHOD FOR AUTOMATICALLY DISTRIBUTING COPIES OF A REPLICATED DATABASE IN A COMPUTER SYSTEM

BACKGROUND OF THE INVENTION

The present invention relates, in general, to the field of computers and computer database systems incorporating a plurality of computer mass storage devices for storing data. More particularly, the present invention relates to a system and method for automatically distributing copies of a replicated database in a computer system.

In a replicated computer database system, copies of the database (the "replicas") are distributed across various physical computer mass storage devices, such as individual disk drives, in order to ensure that the loss of a single drive does not compromise the contents of the database. In other words, replicated systems must guarantee that the most recent data is being presented to the system. Shared sets of disk drives in multi-host computer systems may comprise a pair of host computers and a plurality of associated disk drives, each storing a portion of the database. However, there has heretofore been no automated means for distribution of database replicas across the various system components to minimize the number of potential single points of failure. The distribution of the replicas has historically been a system administration function effectuated on an ad hoc basis and, as a consequence, its efficacy has been dependent on the knowledge and skills of a given system administrator. Moreover, the distribution of replicas in this manner can often result in the utilization of an excessive number of replicas to ensure data availability with a concomitant degradation in overall system performance.

SUMMARY OF THE INVENTION

The system and method of the present invention advantageously automates the distribution of replicas in a replicated database without relying solely on the system administrator to perform this function. While nevertheless allowing for the system administrator to exercise judgment in the final placement of replicas, the computer program implemented function disclosed herein provides a system and method of especial utility in the automated distribution of database replicas such that single points of failure are minimized.

In order to effectuate this, the present invention provides a computer program product, system and method which first analyzes the organization of the computer mass storage devices and controllers attached to the computer system and then determines the optimal distribution of the replicas such that the failure of one or more controllers, computer mass storage devices or groups thereof (the latter hereinafter referred to as "trays" in conjunction with the SPARCstorage™ Array ("SSA") series of computer mass storage disk drive arrays) will not result in a lack of database service.

In a particular embodiment disclosed herein in conjunction with the DiskSuite™ computer program developed and licensed by Sun Microsystems, Inc., assignee of the present invention, the system, method and computer program product of the present invention will automatically distribute database replicas such that more than a single drive, tray or controller may be lost without compromising system integrity.

Particularly disclosed herein is a computer implemented system and method for automatically distributing copies of a replicated database for a computer system comprising at least first and second host computers. Each of the host computers operatively control at least one associated computer mass storage device controller coupled to commonly accessible computer mass storage devices by means of at least one storage device bus. The system and method comprises the step of enumerating each of the various host computers of the computer system, each of the computer mass storage device controllers associated with each host computer and each of the computer mass storage devices coupled to the storage device buses coupling the controllers. Copies of the replicated database are then automatically distributed across the computer mass storage devices such that failures of one or more of the computer mass storage device controllers or the computer mass storage devices will not interrupt operation of the replicated database in the computer system.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
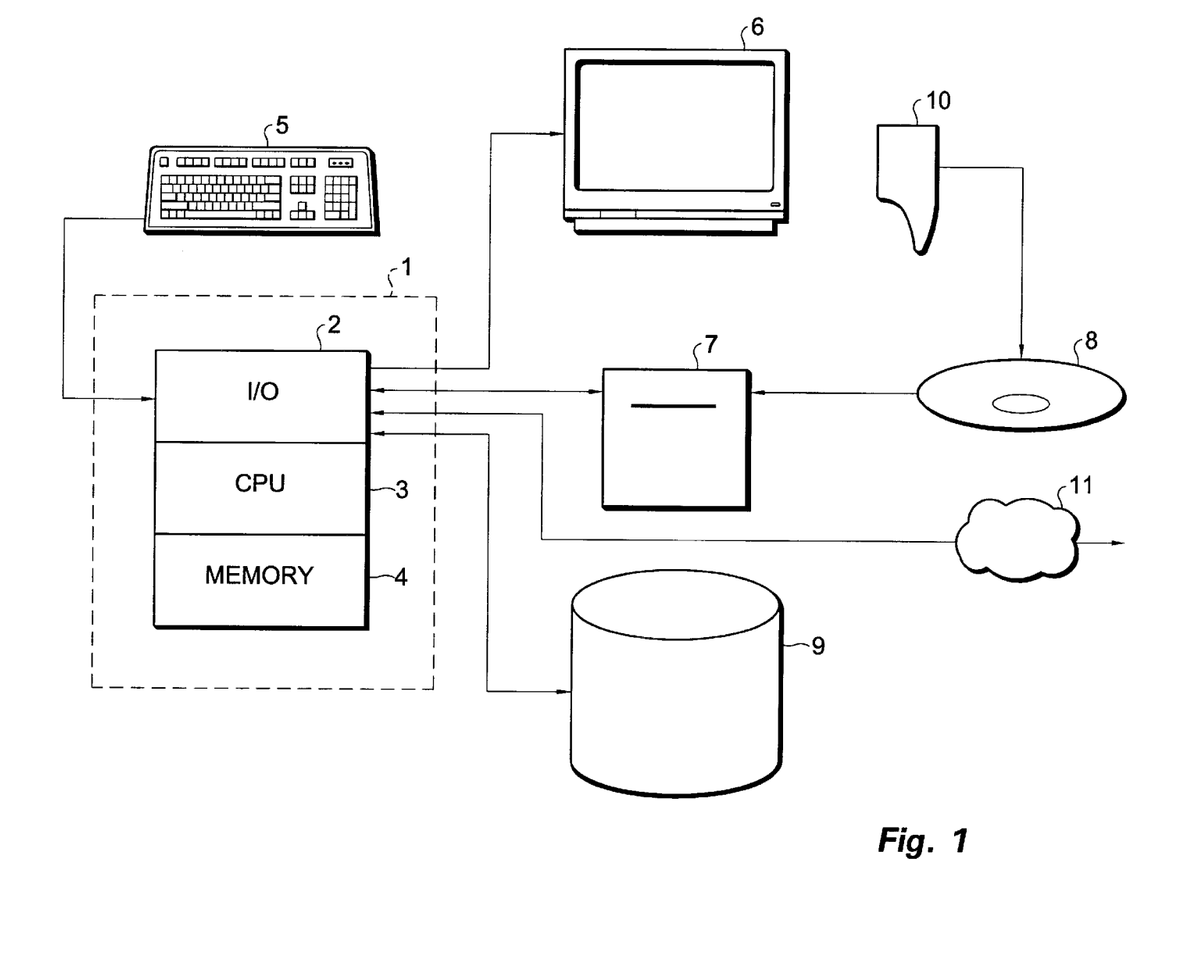
FIG. 1 is a simplified representational drawing of a general purpose computer forming a portion of the operating environment of the present invention.

The environment in which the present invention is used encompasses the general distributed computing system, wherein general purpose computers, workstations or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 may be connected to a keyboard 5, a display unit 6, a disk storage unit 9, a CDROM drive or unit 7 or a computer network 11 such as a wide area network ("WAN"), local area network ("LAN") or other network connection such as the Internet. The CDROM unit 7 can read a CDROM or CDROM medium 8 which typically contains programs 10 and data. The computer program products containing mechanisms to effectuate the apparatus and methods of the present invention may reside in the memory section 4, or on a disk storage unit 9 or on the CDROM 8 or network 11 of such a system.

Figure 2:
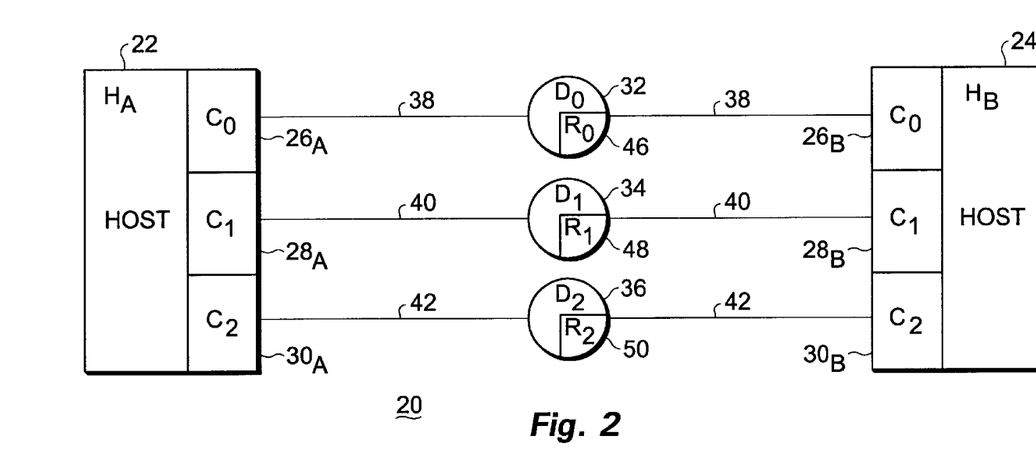
FIG. 2 is a simplified conceptual representation of a computer system for possible utilization in conjunction with a replicated database comprising, for example, a pair of host computers $H_A$ and $H_B$ each having a number of storage controllers $C_0$, $C_1$ and $C_2$ in operative association therewith each coupled to common computer mass storage device bus to which are coupled one or more computer mass storage devices (such as Winchester, "fixed", "rigid" or "hard" disk drives) collectively represented as devices $D_0$, $D_1$, and $D_2$ respectively each having a portion thereof for storing a database replica $R_0$, $R_1$ and $R_2$.

With reference additionally now to FIG. 2, a simplified conceptual representation of a computer system 20 for possible utilization in conjunction with a replicated database is shown. The computer system 20 comprises, for example, a pair of host computers $H_A$ 22 and $H_B$ 24 each having a number of storage controllers $C_0$, $C_1$ and $C_2$ in operative association therewith. The controllers $C_0$ $26_A$, $C_1$ $28_A$ and $C_2$ $30_A$ are associated with host 22 while the controllers $C_0$ $26_B$, $C_1$ $28_B$ and $C_2$ $30_B$ are associated with host 24. The pairs of controllers $C_0$, $C_1$ and $C_2$ are each coupled to respectively common computer mass storage device buses 38, 40 and 42 to which are coupled one or more computer mass storage device(s) (such as Winchester, "fixed", "rigid" or "hard" disk drives) collectively represented as devices $D_0$ 32, $D_1$ 34 and $D_2$ 36 as shown. Each of the device(s) $D_0$ 32, $D_1$ 34 and $D_2$ 36 have a portion thereof for storing a database replica $R_0$ 46, $R_1$ 48 and $R_2$ 50.

Figure 3:
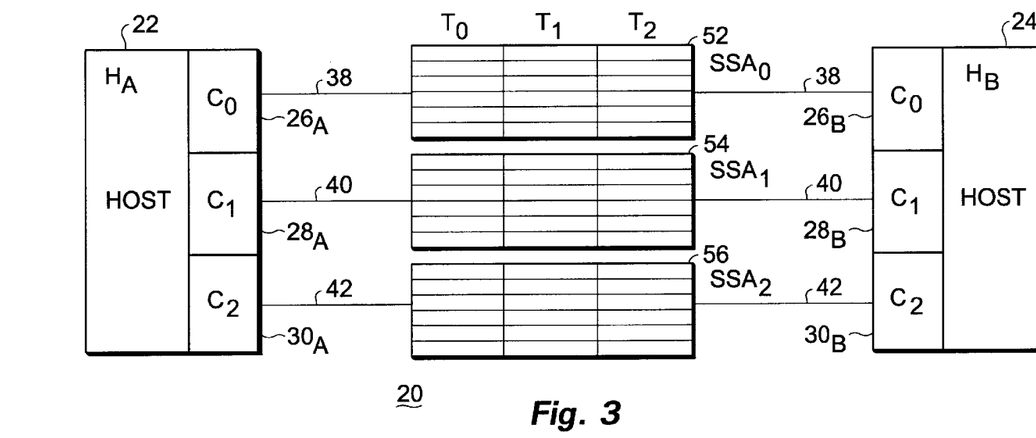
FIG. 3 is a further conceptual representation of a computer system for possible utilization in conjunction with a replicated database comprising, for example, a number of SPARCstorage™ Array ("SSA") disk drive arrays $SSA_0$, $SSA_1$, $SSA_2$ each having a number of disk drive trays $T_0$, $T_1$ and $T_2$ comprising, for example, six disk drives when utilized in conjunction with a Small Computer System Interface ("SCSI") computer mass storage bus.

With reference additionally now to FIG. 3, a further conceptual representation of a computer system 20 for possible utilization in conjunction with a replicated database is shown. The computer system 20 is similar to that shown in FIG. 2 except that the representation of the devices 32, 34 and 36 (FIG. 2) have been expanded to, for example, a number of SPARCstorage™ Array ("SSA") disk drive arrays $SSA_0$ 52, $SSA_1$ 54, $SSA_2$ 56 respectively. Each of the disk drive arrays $SSA_0$ 52, $SSA_1$ 54, $SSA_2$ 56 have a number of disk drive trays $T_0$, $T_1$ and $T_2$ comprising, for example, six disk drives, which is the maximum which can be utilized in conjunction with conventional SCSI computer mass storage buses 38, 40 and 42 respectively wherein each bus supports a total of eight initiator and target devices. Fast/Wide SCSI would allow for use with up to 14 target devices in conjunction with two initiator/hosts. The system and method herein disclosed may also be utilized, for example, in conjunction with a fiber channel connection in lieu of other bus architectures.

Figure 4:
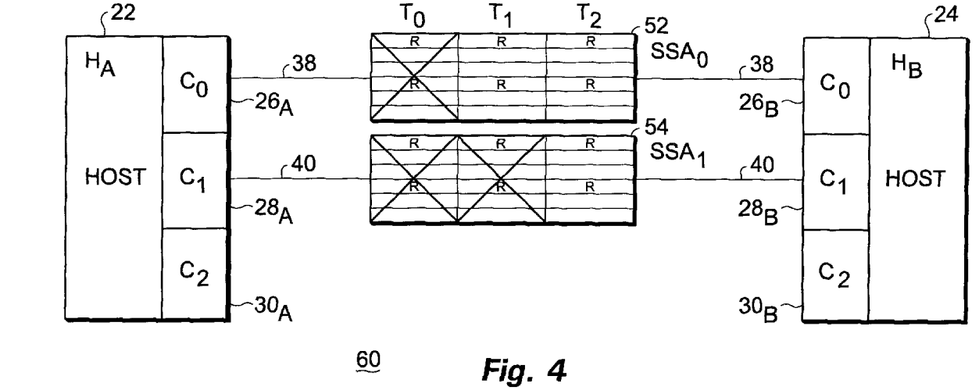
FIG. 4 is an additional conceptual representation of a computer system for possible utilization in conjunction with a replicated database comprising, for example, a pair of host computers $H_A$ and $H_B$ each having a pair of controllers $C_0$ and $C_1$ coupled to disk drive arrays $SSA_0$ and $SSA_1$ respectively having a plurality of distributed database replicas ("R") resident on certain of the disk drives of particular trays $T_0$, $T_1$ and $T_2$ and wherein 50% of the trays have "failed" as indicated by the Xs through trays $T_0$ of $SSA_0$ and $SSA_1$ and tray $T_1$ of $SSA_2$.

With reference additionally now to FIG. 4, an additional conceptual representation of a computer system 60 for possible utilization in conjunction with a replicated database is shown. The computer system 60 comprises, for example, a pair of host computers $H_A$ 22 and $H_B$ 24 as previously described with respect to the preceding figures each having a pair of controllers $C_0$ $26_A/26_B$ and $C_1$ $28_A/28_B$ coupled to disk drive arrays $SSA_0$ 52 and $SSA_1$ 54 respectively. The disk drive arrays $SSA_0$ 52 and $SSA_1$ 54 are shown as having a plurality of distributed database replicas ("R") resident on certain of the disk drives of particular trays $T_0$, $T_1$ and $T_2$.

In this example, exactly 50% of the trays have "failed" as indicated by the Xs through trays $T_0$ of $SSA_0$ 52 and $SSA_0$ 54 and tray $T_1$ of $SSA_1$ 54 and exactly half of the previously available replicas are no longer accessible.

As previously noted, replicated systems must guarantee that the most recent data is being presented to the computer system 60. The worst case scenario that must be detected and prevented if at all possible is a double replica failure, sometimes referred to as "split brain". The "split brain" scenario occurs when two identical copies of data are in use (e.g. "a" and "b"). At some point in time, assume "b" becomes unaccessible and "a" is in use. Thereafter, if "a" becomes unaccessible and "b" then becomes accessible and in use, "old" data can be unknowingly used. Even worse is the situation where "a" and "b" then both become accessible and in use wherein different data can be provided at different times with no updates being done between times.

Utilizing the system and method of the present invention as embodied in the DiskSuite™ computer program, the "split brain" problem is obviated by replicating the database and requiring a "replica quorum". A replica quorum is achieved if at least HALF+1 of the replicas are accessible. For example, if there are three or more replicas available on separate computer mass storage devices or controllers, then the database can sustain a single replica failure. In the example of FIG. 4, since a replica quorum cannot be obtained (i.e. only 50% of the replicas are available and not 50%+1 replicas), then the system administrator must intervene to correct the problem so that "old" data and/or "garbage" data will not be used.

Figure 5:
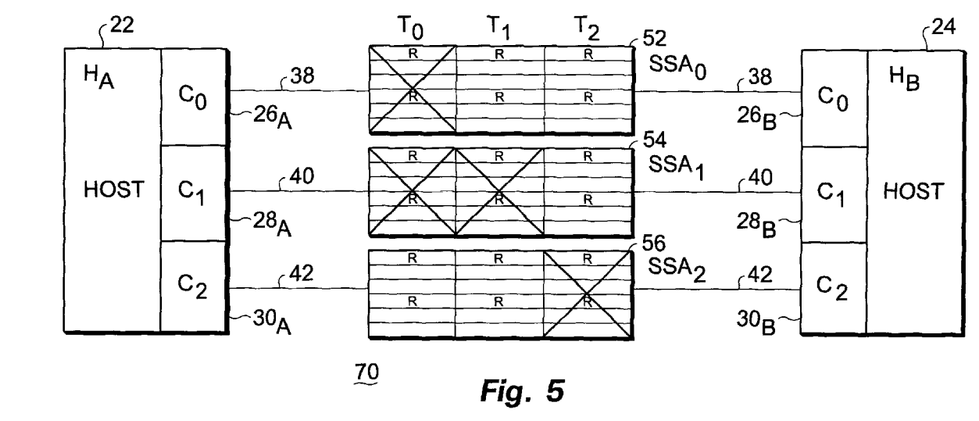
FIG. 5 is a follow-on conceptual representation of the computer system of FIG. 4 showing, for example, the situation wherein an additional controller $C_2$ is associated with hosts $H_A$ and $H_B$ coupled to $SSA_2$ wherein tray $T_2$ thereof has failed and wherein 55% of the trays incorporating database replicas have not failed.

With reference additionally now to FIG. 5, a follow-on conceptual representation of a computer system 70 which is built upon the computer system 60 of FIG. 4 is shown. The computer system 70 comprises, for example, an additional pair of controllers $C_2$ associated with hosts $H_A$ 22 (controller $30_A$) and $H_B$ 24 (controller $30_B$) which may have been later added to the computer system 60 (FIG. 4) or an original part thereof. In this example, the additional controllers $30_A$ and $30_B$ are coupled to $SSA_2$ 56 by means of computer mass storage device bus 42 and tray $T_2$ thereof is additionally shown as having failed. In this example, (and unlike the computer system 60 of FIG. 4) more than 50% of the database replicas remain and approximately 55% of the trays incorporating database replicas have not failed. For this reason, a replica quorum is obtained since at least HALF+1 of the replicas remain accessible.

A computer implemented method in accordance with this invention automatically distributes copies of a replicated database for a computer system wherein that system comprises at least first and second host computers. Each of these host computers operatively controls at least one associated computer mass storage device controller coupled to commonly accessible computer mass storage devices by means of at least one storage device bus.

The method of this invention includes the step of enumerating each of the at least first and second host computers of the system, each of the at least one computer mass storage device controllers and each of the computer mass storage devices coupled to an aforementioned storage device bus. Copies of the replicated database are then automatically distributed across the computer mass storage devices such that one or more failures of the aforesaid computer mass storage device controllers or the computer mass storage devices will not interrupt operation of the replicated database in the computer system.

The aforementioned computer implemented method can further include the step of defining a layout of the computer system in accordance with the enumerating step prior to the aforesaid step of automatically distributing. This process is set forth in greater detail in the exemplary embodiment associated with the listing of pseudocode below.

The following is a representative computer program pseudocode list which may be used to automate the allocation of replicas in a particular diskset configuration of possible use in conjunction with the Disksuite™ computer program:

```
If ((# ctlrs. >= 3) &&
        ((ctlrs. have differing # of drives) ||
        (ctlrs. have same # of drives && # of drives/ctlr < 30)
        )
    )
{
        replicas/ctlr = min((smallest # disks on any ctlr), 12)
} else
{
        if (# SCSI chains <= 25)
                2 replicas/SCSI chain
        else if (# SCSI chains <= 50)
                1 replica/SCSI chain
        else if (# controllers <= 25)
                2 replicas/controller
        else if (# controllers <= 50)
                1 replica/controller
        else
                1 replica on 50 controllers
}
```

The following computer program source listing is a further example of a computer implemented method that may be utilized in conjunction with the DiskSuite™ program available from Sun Microsystems, Inc. to automate the allocation of replicas in a diskset:

```
*/
/*
 * Database location balancing code.
 */
#include <meta.h>
#include <sys/md_mddb.h>
#define MD_MINBALREP     MD_MINREPLICAS
static int
add_replica(
        mdsetname_t             *sp,
        mddrivename_t           *dnp,
        int                     dbcnt,
        daddr_t                 dbsize,
        md_error_t              *ep
)
{
        mdnamelist_t            *nlp = NULL;
        mdname_t                *np;
        md_set_desc             *sd;
        if ((np = metaslicename(dnp, MD_SLICE7, ep)) == NULL)
                return (-1);
        (void) metanamelist_append(&nlp, np);
        if ((sd = metaget_setdesc(sp, ep)) == NULL) {
                metafreenamelist(nlp);
                return (-1);
        }
        if (meta_db_attach(sp, nlp,
                (MDCHK_DRVINSET | MDCRK_SET_LOCKED),
                &sd->sd_ctime, dbcnt, dbsize, NULL, ep) == -1) {
                metafreenamelist(nlp);
                return (-1);
        }
```

-continued

```
        metafreenamelist(nlp);
        return (0);
}
static int
del_replica(
        mdsetname_t             *sp,
        mddrivename_t           *dnp,
        md_error_t              *ep
)
{
        mdnamelist_t            *nlp = NULL;
        mdname_t                *np;
        if ((np = metaslicename(dnp, MD_SLICE7, ep)) == NULL)
                return (-1);
        (void) metanamelist_append(&nlp, np);
        if (meta_db_detach(sp, nlp,
                (MDFORCE_DS | MDFORCE_SET_LOCKED),
                NULL, ep) == -1) {
                metafreenamelist(nlp);
                return (-1);
        }
        metafreenamelist(nlp);
        return (0);
}
static int
add_drv_to_ctl_lst(
        md_ctlr_ctl_t           **clpp,
        mddrivename_t           *dnp,
        int                     dbcnt,
        daddr_t                 dbsize,
        mdcinfo_t               *cinfop,
        int                     indiskset,
        int                     with_bus,
        md_error_t              *ep
)
{
        md_ctlr_drv_t           **dpp;
        mdname_t                *np;
        mdcinfo_t               *tcinfop;
        /*
         * The user must pass in a list head.
         */
        assert(clpp != NULL);
        if (cinfop == NULL) {
                if ((np = metaslicename(dnp, MD_SLICE7, ep)) == NULL)
                        return (-1);
                if ((tcinfop = metagetcinfo(np, ep)) == NULL)
                        return (-1);
        } else
                tcinfop = cinfop;
        for (/* void */; *clpp != NULL; clpp = &(*clpp)->ctl_next) {
                /*
                 * Try to locate ctlr.
                 */
                if (tcinfop->ctype != (*clpp)->ctl_cinfop->ctype ||
                        tcinfop->cnum != (*clpp)->ctl_cinfop->cnum ||
                        strncmp(tcinfop->cname,
                        (*clpp)->ctl_cintop->cname, 16) != 0 ||
                        (with_bus && tcinfop->bus !=
                                (*clpp)->ctl_cinfop->bus))
                                continue;
                /*
                 * Found ctlr, try to locate the drive.
                 */
                for (dpp = &(*clpp)->ctl_drvs; *dpp != NULL;
                        dpp = &(*dpp)->drv_next) {
                        if (strcmp((*dpp)->drv_dnp->cname, dnp->cname) != 0)
                                continue;
                        /*
                         * Found drive, must he deleting.
                         */
                        (*dpp)->drv_op = DRV_DEL;
                        if (indisk(set)
                                (dpp)-22 drv_flags |= DRV_F_INDISKSET;
                        (*clpp)->ctl_dbcnt -= (*dpp)->drv_dbcnt;
                        (*clpp)->ctl_drcnt--;
                        return (0);
                }
```

```
            /*
             * The ctlr was found, but not the drive, so add
             * the drive
             */
            (*dpp) = Zalloc(sizeof (**dpp));
            if (indiskset) {
                  (*dpp)->drv_op = DRV_NOP;
                  (*dpp)->drv_flags |= DRV_F_INDISKSET;
            } else {
                  (*dpp)->drv_op = DRV_ADD;
                  assert(dbsize != 0);
            }
            (*dpp)->drv_dbcnt = dbcnt;
            (*dpp)->drv_dbsize = dbsize;
            (*dpp)->drv_dnp = dnp;
            (*clpp)->ctl_dbcnt += dbcnt;
            (*clpp)->ctl_drcnt ++;
            return (0);
      }
      /*
       * No ctlr was located, so add the ctlr, then recurse to add the
       * drive to the ctlr.
       */
      (*clpp) = Zalloc(sizeof (**clpp));
      (*clpp)->ctl_cinfop = tcinfop;
      return (add_drv_to_ctl_lst(clpp, dnp, dbcnt, dbsize, tcinfop,
            indiskset, with_bus, ep));
}
static int
add_replica_to_ctl(
      mdsetname_t                *sp,
      md_ctlr_ctl_t              *c,
      int                        minimum_replicas,
      md_error_t                 *ep
)
{
      md_ctlr_drv_t              *d;
      int                        maxdb = 0;
      /*
       * If this ctrl has no "usable" drives, assert( ) or just return if
       * assert( )'s are turned off.
       */
      if (c->ctl_drcnt == 0) {
            assert(0);
            return (0);
      }
      /*
       * Determine the largest DB count on a drive.
       */
      for (d = c->ctl_drvs; d != NULL; d = d->drv_next)
            if (d->drv_dbcnt > maxdb && d->drv_op != DRV_DEL)
                  maxdb = d->drv_dbcnt;
      /*
       * Make sure we start at a reasonable number
       */
      if (maxdb == 0)
            maxdb = 1;
      /*
       * Add a replica to a drive on this ctrl.
       */
      /*CONSTCOND*/
      while (1) {
            for (d = c->ctl_drvs; d != NULL; d = d->drv_next) {
                  /*
                   * If this drive is being delete, skip it.
                   */
                  if (d->drv_op == DRV_DEL)
                        continue;
                  if (d->drv_flags & DRV_F_ERROR)
                        continue;
                  /*
                   * Make sure that the replicas are distributed across
                   * the drives.
                   */
                  if (d->drv_dbcnt >= maxdb)
                        continue;
                  /*
                   * See if the drive already has replicas,
                   * if it does, then delete the existing
```

```
                   * replica(s) and re-add n+1 replicas to the drive.
                   */
                  /* ==== Vulnerability - no DB's start ==== */
                  if (d->drv_dbcnt > 0) {
                        if (del_replica(sp, d->drv_dnp, ep) == -1) {
                              d->drv_flags |= DRV_F_ERROR;
                              if (! (d->drv_flags & DRV_F_INDISKSET))
                                    return (-1);
                              mdclrerror(ep);
                              continue;
                        }
                  }
                  if (add_replica(sp, d->drv_dnp, (d->drv_dbcnt + 1),
                        d->drv_dbsize, ep) == -1) {
                        if (d->drv_dbcnt) {
                              c->ctl_dbcnt -= d->drv_dbcnt;
                              d->drv_dbcnt = 0;
                        }
                        if (mdismddberror(ep,
                              MDE_TOOMANY_REPLICAS))
                              return (-1);
                        d->drv_flags |= DRV_F_ERROR;
                        if (! (d->drv_flags & DRV_F_INDISKSET))
                              return (-1);
                        mdclrerror(ep);
                        continue;
                  }
                  d->drv_dbcnt++;
                  c->ctl_dbcnt++;
                  /* ==== Vulnerability - no DB's end ==== */
                  return (1);
            }
            maxdb++;
            if (maxdb > minimum_replicas)
                  return (0);
      }
      /*NOTREACHED*/
}
static int
del_replica_from_ctl(
      mdsetname_t                *sp,
      md_ctlr_ctl_t              *c,
      md_error_t                 *ep
)
{
      md_ctlr_drv_t              *d;
      int                        maxdb = 0;
      /*
       * If this ctrl has no "usable" drives, assert( ) or just return if
       * assert( )'s are turned off.
       */
      if (c->ctl_drcnt == 0) {
            assert(0);
            return (0);
      }
      /*
       * Determine the largest DB count on a drive.
       */
      for (d = c->ctl_drvs; d != NULL; d = d->drv_next)
            if (d->drv_dbcnt > maxdb && d->drv_op != DRV_DEL)
                  maxdb = d->drv_dbcnt;
      if (maxdb == 0)
            return (0);
      /*
       * Delete a replica from a drive on this ctrl.
       */
      /*CONSTCOND*/
      while (1) {
            for (d = c->ctl_drvs; d != NULL; d = d->drv_next) {
                  /*
                   * If this drive is being delete, skip it.
                   */
                  if (d->drv_op == DRV_DEL)
                        continue;
                  if (d->drv_flags & DRV_F_ERROR)
                        continue;
                  /*
                   * Make sure that there are replicas on this drive to
                   * delete.
```

```
        */
        if (d->drv_dbcnt == 0)
            continue;
        /*
         * We need to keep the DB's distributed across the
         * drives.
         */
        if (d->drv_dbcnt < maxdb)
            continue;
        /*
         * Delete all the replicas on the drive.
         */
        /* ==== Vulnerability - no DB's start ==== */
        if (del_replica(sp, d->drv_dnp, ep) == -1) {
            d->drv_flags |= DRV_F_ERROR;
            if (! (d->drv_flags & DRV_F_INDISKSET))
                return (-1);
            mdclrerror(ep);
            continue;
        }
        d->drv_dbcnt--;
        c->ctl_dbcnt--;
        /*
         * If there is still a dbcnt for this drive, then add
         * back the needed DB's.
         */
        if (d->drv_dbcnt > 0) {
            if (add_replica(sp, d->drv_dnp, d->drv_dbcnt,
                d->drv_dbsize, ep) == -1) {
                c->ctl_dbcnt -= d->drv_dbcnt;
                d->drv_dbcnt = 0;
                if (mdismddberror(ep,
                    MDE_TOOMANY_REPLICAS))
                    return (-1);
                d->drv_flags |= DRV_F_ERROR;
                if (! (d->drv_flags & DRV_F_INDISKSET))
                    return (-1);
                mdclrerror(ep);
                continue;
            }
        }
        /* ==== Vulnerability - no DB's end ==== */
        return (1);
    }
    maxdb--;
    if (maxdb <= 0)
        return (0);
}
/*NOTREACHED*/
}
static int
del_replicas(mdsetname_t *sp, md_ctlr_ctl_t *clp, md_error_t *ep)
{
    md_ctlr_ctl_t       *c;
    md_ctlr_drv_t       *d;
    mdnamelist_t        *nlp;
    mdname_t            *np;
    for (c = clp; c != NULL; c = c->ctl_next) {
        for (d = c->ctl_drvs; d != NULL; d = d->drv_next) {
            if (! (d->drv_flags & DRV_F_ERROR) &&
                (d->drv_op != DRV_DEL))
                continue;
            if (d->drv_dbcnt == 0)
                continue;
            np = metaslicename(d->drv_dnp, MD_SLICE7, ep);
            if (np == NULL)
                return (-1);
            nlp = NULL;
            (void) metanamelist_append(&nlp, np);
            /*
             * Delete the replicas listed.
             */
            if (meta_db_detach(sp, nlp,
                (MDFORCE_DS | MDFORCE_SET_LOCKED),
                NULL, ep) == -1) {
                metafreenamelist(nlp);
                if (d->drv_flags & DRV_F_INDISKSET) {
                    mdclrerror(ep);
                    continue;
```

```
                }
                return (-1);
            }
            metafreenamelist(nlp);
        }
    }
    return (0);
}
static void
free_ctlr_lst(md_ctlr_ctl_t **clpp)
{
    md_ctlr_ctl_t       *c, *tc = NULL;
    md_ctlr_drv_t       *d, *td = NULL;
    for (c = *clpp; c != NULL; c = tc) {
        tc = c->ctl_next;
        for (d = c->ctl_drvs; d != NULL; d = td) {
            td = d->drv_next;
            Free(d);
        }
        Free(c);
    }
    *clpp = NULL;
}
static int
build_ctlr_lst(
    mdsetname_t         *sp,
    md_ctlr_ctl_t       **clpp,
    md_drive_desc       *opdd,
    md_drive_desc       *curdd,
    int                 with_bus,
    daddr_t             dbsize,
    md_error_t          *ep
)
{
    md_drive_desc       *d;
    daddr_t             nblks;
    daddr_t             min_dbsize = MD_DBSIZE;
    if ((nblks = meta_db_minreplica(sp, ep)) < 0)
        mdclrerror(ep);
    else
        min_dbsize = nblks;
    /*
     * Add drives currently in the set to the ctlr list.
     */
    for (d = curdd; d != NULL; d = d->dd_next) {
        daddr_t this_dbsize = d->dd_dbsize;
        if (this_dbsize == 0)
            this_dbsize = min_dbsize;
        if (add_drv_to_ctl_lst(clpp, d->dd_dnp, d->dd_dbcnt,
            this_dbsize, NULL, TRUE, with_bus, ep) == -1)
            return (-1);
    }
    /*
     * Add the drives that are being operated on to the ctlr list.
     */
    for (d = opdd; d != NULL; d = d->dd_next)
        if (add_drv_to_ctl_lst(clpp, d->dd_dnp, 0, dbsize,
            NULL, FALSE, with_bus, ep) == -1)
            return (-1);
    return (0);
}
static void
count_replica_on_ctl(
    md_ctlr_ctl_t       *c,
    int                 adding,
    int                 *db_cnt,
    int                 minimum_replicas
)
{
    md_ctlr_drv_t       *d;
    int                 maxdb = 0;
    /*
     * If this ctrl has no "usable" drives,
     * nothing to do.
     */
    if (c->ctl_drcnt == 0)
        return;
    /*
     * Determine the largest DB count on a drive.
```

```
            */
           for (d = c->ctl_drvs; d != NULL; d = d->drv_next)
                if (d->drv_dbcnt > maxdb && d->drv_op != DRV_DEL)
                    maxdb = d->drv_dbcnt;
       /*
        * Make sure we start at a reasonable number
        */
       if (maxdb == 0) {
           if (!adding)
               return;
           maxdb = 1;
       }
       /*
        * Count or Un-Count replicas that would be
        * added or deleted respectively.
        */
       /*CONSTCOND*/
       while (1) {
           for (d = c->ctl_drvs; d != NULL; d = d->drv_next) {
                /*
                 * If this drive is being delete, skip it.
                 */
                if (d->drv_op == DRV_DEL)
                    continue;
                /*
                 * Make sure that the replicas are distributed across
                 * the drives.
                 */
                if (adding) {
                    if (d->drv_dbcnt >= maxdb)
                        continue;
                } else {
                    if (d->drv_dbcnt == 0)
                        continue;
                    if (d->drv_dbcnt < maxdb)
                        continue;
                }
                /*
                 * Count or Un-Count replicas here.
                 */
                if (adding)
                    (*db_cnt)++;
                else
                    (*db_cnt)--;
                return;
           }
           /*
            * This should make sure they get spread
            * around. This is to emulate the {add,del}_replica
            * routines.
            */
           if (adding) {
                maxdb++;
                if (maxdb > minimum_replicas)
                    return;
           } else {
                maxdb--;
                if (maxdb <= 0)
                    return;
           }
       }
       /*NOTREACHED*/
   }
   static int
   count_replicas(
       md_ctlr_ctl_t              *clp,
       int                        min_reps
   )
   {
       md_ctlr_ctl_t              *c;
       int                        db_cnt;
       int                        uctlrs = 0;
       int                        total_cnt = 0;
       /*
        * Count the number of controllers,
        * counting the replicas is slightly different based
        * on the controller count.
        */
       for (c = clp; c != NULL; c = c->ctl_next)
           if (c->ctl_drcnt > 0)
                uctlrs++;
       if (uctlrs > 2) {
           for (c = clp; c != NULL; c = c->ctl_next) {
                if (c->ctl_drcnt == 0)
                    continue;
                db_cnt = c->ctl_dbcnt;
                /*
                 * Count the replicas that would be added.
                 */
                while (db_cnt < min_reps)
                    count_replica_on_ctl(c, TRUE,
                        &db_cnt, min_reps);
                /*
                 * Un-Count the replicas that would be deleted.
                 */
                while (db_cnt > min_reps)
                    count_replica_on_ctl(c, FALSE,
                        &db_cnt, min_reps);
                total_cnt += db_cnt;
           }
       } else {
           for (c = clp; c != NULL; c = c->ctl_next) {
                if (c->ctl_drcnt == 0)
                    continue;
                db_cnt = c->ctl_dbcnt;
                /*
                 * Count the replicas that would be added.
                 */
                while (db_cnt < (min_reps * c->ctl_drcnt))
                    count_replica_on_ctl(c, TRUE,
                        &db_cnt, min_reps);
                total_cnt += db_cnt;
           }
       }
       return (total_cnt);
   }
   static int
   balance_replicas(
       mdsetname_t                *sp,
       md_ctlr_ctl_t              **clpp,
       md_drive_desc              *opdd,
       md_drive_desc              *curdd,
       daddr_t                    dbsize,
       int                        *minimum_replicas,
       md_error_t                 *ep
   )
   {
       int                        n;
       int                        uctlrs = 0;
       int                        prevcnt = 0, issame = 1;
       u_int                      drvcnt = ~0U;
       md_ctlr_ctl_t              *c;
       /*
        * Build a ctlr list with SSA-100 busses
        * NOT being a separate controller.
        */
       if (build_ctlr_lst(sp, clpp, opdd, curdd, FALSE, dbsize, ep) == -1)
           return (-1);
       /*
        * Determine what controllers are usable in the sense of being able
        * to add a replica to a drive on the controller.
        * Also find the minimum number of drives on a controller.
        */
       for (c = *clpp; c != NULL; c = c->ctl_next) {
           if (c->ctl_drcnt > 0) {
                uctlrs++;
                drvcnt = min(drvcnt, c->ctl_drcnt);
                if_prevcnt == 0)
                    prevcnt = c->ctl_drcnt;
                else if (prevcnt != c->ctl_drcnt)
                    issame = 0;
           }
       }
       if ((uctlrs <= 2) || (issame && (drvcnt >= 30)))
           goto cont;
       /*
        * If here: Handling 3 or more controllers most
        *      likely with non-symmetrical number of
```

-continued

```
 *      disks. The number of replicas will be
 *      the minimum number of disks on a controller.
 *
 *      The main point is to insure that a
 *      controller does not have more than half
 *      of the replicas.
 */
drvcnt = min(drvcnt, 12);
/*
 * Can we find fewer than the maximum replicas
 * by reducing the number of replicas per drive.
 */
for (n = drvcnt; n > 0; n--)
        if (count_replicas(*clpp, n) <= MDDB_NLB) {
                *minimum_replicas = n;
                return (0);
        }
cont:
        free_ctlr_lst(clpp);
        /*
         * Build a ctlr list with SSA-100 busses
         * being a separate controller.
         *
         * If Here: Try to put 2 replicas per controller/bus
         *          If that doesn't work put 1 replica per controller/bus
         */
        if (build_ctlr_lst(sp, clpp, opdd, curdd, TRUE, dbsize, ep) == -1)
                return (-1);
        /*
         * Can we find fewer than the maximum replicas
         * by reducing the number of replicas per drive.
         */
        for (n = MD_MINBALREP; n > 0; n--)
                if (count_replicas(*clpp, n) <= MDDB_NLB) {
                        *minimum_replicas = n;
                        return (0);
                }
        free_ctlr_lst(clpp);
        /*
         * Build a ctlr list with SSA-100 busses
         * NOT being a separate controller.
         *
         * If Here: Try to put 2 replicas per controller (not on busses)
         *          If that doesn't work put 1 replica per controller
         */
        if (build_ctlr_lst(sp, clpp, opdd, curdd, FALSE, dbsize, ep) == -1)
                return (-1);
        /*
         * Can we find fewer than the maximum replicas
         * by reducing the number of replicas per drive.
         */
        for (n = MD_MINBALREP; n > 0; n--)
                if (count_replicas(*clpp, n) <= MDDB_NLB) {
                        *minimum_replicas = n;
                        return (0);
                }
        /*
         * Return a ctrl list that does not include
         * the SSA-100 bus as a separate controller.
         * This will create few separate controllers.
         */
        *minimum_replicas = 1;
        return (0);
}
static int
morethan2_ctl_balance(
        mdsetname_t             *sp,
        md_ctlr_ctl_t           *clp,
        int                     min_reps,
        md_error_t              *ep
)
{
        md_ctlr_ctl_t           *c;
        int                     err;
        for (c = clp; c != NULL; c = c->ctl_next) {
                if (c->ctl_drcnt == 0)
                        continue;
                while (c->ctl_dbcnt < min_reps) {
                        if ((err = add_replica_to_ctl(sp, c, min_reps, ep)) < 0)
                                return (-1);
                        if (err == 0)
                                break;
                }
                while (c->ctl_dbcnt > min_reps) {
                        if ((err = del_replica_from_ctl(sp, c, ep)) < 0)
                                return (-1);
                        if (err == 0)
                                break;
                }
        }
        return (0);
}
static int
lessthan3_ctl_balance(
        mdsetname_t             *sp,
        md_ctlr_ctl_t           *clp,
        int                     min_reps,
        md_error_t              *ep
)
{
        md_ctlr_ctl_t           *c;
        int                     err;
        for (c = clp; c != NULL; c = c->ctl_next) {
                if (c->ctl_drcnt == 0)
                        continue;
                while (c->ctl_dbcnt < (min_reps * c->ctl_drcnt)) {
                        if ((err = add_replica_to_ctl(sp, c, min_reps, ep)) < 0)
                                return (-1);
                        if (err == 0)
                                break;
                }
        }
        return (0);
}
static int
try_again(
        md_ctlr_ctl_t           *clp,
        md_error_t              *ep
)
{
        md_ctlr_ctl_t           *c;
        md_ctlr_drv_t           *d;
        if (mdismddberror(ep, MDE_TOOMANY_REPLICAS))
                return (TRUE);
        /*
         * retry if all the errored drives
         * are already in the diskset.
         */
        for (c = clp; c != NULL; c = c->ctl_next) {
                for (d = c->ctl_drvs; d != NULL; d = d->drv_next) {
                        if ((d->drv_flags &
                            (DRV_F_INDISKSET|DRV_F_ERROR))
                                == DRV_F_ERROR)
                                return (FALSE);
                }
        }
        return (TRUE);
}
int
meta_db_balance(
        mdsetname_t             *sp,
        md_drive_desc           *opdd,
        md_drive_desc           *curdd,
        daddr_t                 dbsize,
        md_error_t              *ep
)
{
        int                     min_reps;
        md_ctlr_ctl_t           *c, *cl = NULL;
        int                     uctlrs = 0;
        int                     retry = 0;
        int                     rval = 0;
        if (balance_replicas(sp, &cl, opdd, curdd,
            dbsize, &min_reps, ep) == -1)
                return (-1);
        /*
         * Determine what controllers are usable in the sense of being able to
         * add a replica to a drive on the controller.
```

-continued

```
*/
    for (c = cl; c != NULL; c = c->ctl_next)
        if (c->ctl_drcnt > 0)
            uctlrs++;
/*
 * Add replicas to achieve a balance.
 */
    if (uctlrs > 2)
        rval = morethan2_ctl_balance(sp, cl, min_reps, ep);
    else
        rval = lessthan3_ctl_balance(sp, cl, min_reps, ep);
    if (rval) {
        if ((retry = try_again(cl, ep)) == TRUE) {
            mdclrerror(ep);
            rval = 0;
        }
    }
/*
 * Delete all the replicas from drives that are so marked.
 */
    if (! rval)
        rval = del_replicas(sp, cl, ep);
    if (retry) {
        if (uctlrs > 2)
            rval = morethan2_ctl_balance(sp, cl, min_reps, ep);
        else
            rval = lessthan3_ctl_balance(sp, cl, min_reps, ep);
        if (rval && mdismddberror(ep,
            MDE_TOOMANY_REPLICAS)) {
            mdclrerror(ep);
            rval = 0;
        }
    }
/*
 * Free up the ctlr list.
 */
    free_ctlr_lst(&cl);
    return (rval);
}
```

While there have been described above the principles of the present invention in conjunction with specific computer system configurations and methods for automatically distributing copies of a replicated database, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A computer implemented method for automatically distributing copies of a replicated database for a computer system comprising at least first and second host computers, each of said host computers operatively controlling at least one associated computer mass storage device controller coupled to commonly accessible computer mass storage devices by means of at least one storage device bus, the method comprising the steps of:

enumerating each of said at least first and second host computers of said computer system, each of said at least one computer mass storage device controllers and each of said computer mass storage devices coupled to said at least one storage device bus; and automatically distributing said copies of said replicated database across said computer mass storage devices such that one or more failures of said at least one computer mass storage device controllers or said computer mass storage devices will not interrupt operation of a quorum of said copies of said replicated database in said computer system.

2. The computer implemented method of claim 1 further comprising the step of:

defining a layout of said computer system in accordance with said step of enumerating prior to said step of automatically distributing.

3. A computer program product comprising:

a computer useable medium having computer readable code embodied therein for causing a computer to effect automatically distributing copies of a replicated database for a computer system comprising at least first and second host computers, each of said host computers operatively controlling at least one associated computer mass storage device controller coupled to commonly accessible computer mass storage devices by means of at least one storage device bus, the computer program product comprising:

computer readable program code devices configured to cause a computer to effect enumerating each of said at least first and second host computers of said computer system, each of said at least one computer mass storage device controllers and each of said computer mass storage devices coupled to said at least one storage device bus; and computer readable program code devices configured to cause a computer to effect automatically distributing said copies of said replicated database across said computer mass storage devices such that one or more failures of said at least one computer mass storage device controllers or said computer mass storage devices will not interrupt operation of said quorum of said of said replicated database in said computer system.

4. The computer program product of claim 3 further comprising:

computer readable program code devices configured to cause a computer to effect defining a layout of said computer system in accordance with said step of enumerating prior to said step of automatically distributing.

5. A computer implemented method for automatically distributing copies of a replicated database for a computer system comprising at least first and second host computers, each of said host computers operatively controlling at least one associated computer mass storage device controller coupled to commonly accessible computer mass storage devices by means of at least one storage device bus, the method comprising the steps of:

providing for enumerating each of said at least first and second host computers of said computer system, each of said at least one computer mass storage device controllers and each of said computer mass storage devices coupled to said at least one storage device bus; and providing for automatically distributing said copies of said replicated database across said computer mass storage devices such that one or more failures of said at least one computer mass storage device controllers or said computer mass storage devices will not interrupt operation of a quorum of said copies of said replicated database in said computer system.

6. The computer implemented method of claim 5 further comprising the step of:

providing for defining a layout of said computer system in accordance with said step of enumerating prior to said step of automatically distributing.

7. A computer system comprising:

at least first and second host computers;

at least first and second computer mass storage device controllers respectively operatively controlled by each of said at least first and second host computers;

a plurality of computer mass storage devices coupled to said at least first and second computer mass storage device controllers by means of at least one storage device bus; and a computer program operative in conjunction with one of said at least first and second host computers to enumerate each of said at least first and second host computers, each of said at least first and second computer mass storage device controllers and each of said computer mass storage devices and to provide for automatically distributing copies of a replicated database across said plurality of computer mass storage devices such that one or more failures of said at least first and second computer mass storage device controllers or said plurality of computer mass storage devices will not interrupt operation of a quorum of said copies of said replicated database in said computer system.

8. The computer system of claim 7 wherein said plurality of computer mass storage devices comprise disk drives.

* * * * *

UNITED STATES PATENT AND TRADEMARK OFFICE
CERTIFICATE OF CORRECTION

PATENT NO. : 6,467,046 B1  Page 1 of 1
DATED : October 15, 2002
INVENTOR(S) : Joseph E. Cunliffe and Dale R. Passmore It is certified that error appears in the above-identified patent and that said Letters Patent is hereby corrected as shown below:

<u>Column 16,</u>
Line 44, change "said" to -- a --
Line 45, after the first occurrence "of said" add -- copies --

Signed and Sealed this

Sixth Day of January, 2004

JAMES E. ROGAN
*Director of the United States Patent and Trademark Office*